July 21, 1953 R. V. STAAF 2,645,831

SUPPORT FOR LUMINOUS TUBING

Filed Jan. 30, 1951

INVENTOR.
RICHARD V. STAAF.
BY
Christy, Parmelee & Strickland
his attorneys

Patented July 21, 1953

2,645,831

UNITED STATES PATENT OFFICE 2,645,831

SUPPORT FOR LUMINOUS TUBING

Richard V. Staaf, Oakdale, Pa.

Application January 30, 1951, Serial No. 208,569

2 Claims. (Cl. 24—81)

This invention relates to a support for luminous tubing, and, more particularly, to an attachment for mounting the tubing on an insulating riser post.

Luminous tubing of the type employed in neon signs and the like is commonly secured to an insulating riser post which in turn is secured to a panel forming a part of the sign, the riser post being generally fabricated from glass, and thereby providing an insulating support for the tubing. The riser posts may, in accordance with conventional practice, have one end threaded for cooperation with a wire coil fastening element by which it may be secured to a sign panel while its other end is bifurcated to provide a saddle for supporting engagement with the luminous tubing. The saddle end of the riser post provides a V-shaped notch in which the luminous tube is receivable, and a pair of oppositely projecting lugs or ears under which a fastening wire may engage to secure the tube in position on the end of the riser post. In making the connection, the fastening wire is wrapped snugly around the tubing and the riser post ears, and the tube is thereby secured tightly to the end of the riser post. The tight engagement of the tubing with the end of the riser post is not a desirable feature in that damage to the tubing or riser post is apt to result from such engagement.

One of the principal objects of this invention is to provide an attachment for facilitating the connection of luminous tubing to a conventional riser post.

A further object of the invention is to provide a mounting attachment for luminous tubing which may be connected to the end of a conventional riser post with a snap action.

A still further object of the invention is to provide an attachment of the character referred to with which the luminous tubing may be engaged with a snap action.

Another object of the invention is to provide an attachment for connecting luminous tubing to conventional riser posts which is constructed from wire, and which provides two pairs of jaws respectively engageable with an end of the riser post, and with the luminous tubing in order to provide a mounting connection between the end of the riser post and the tubing.

Other objects and advantages of the invention will be apparent from the following description.

In the drawings, there is shown a preferred embodiment of the invention. In this showing:

Figure 1:
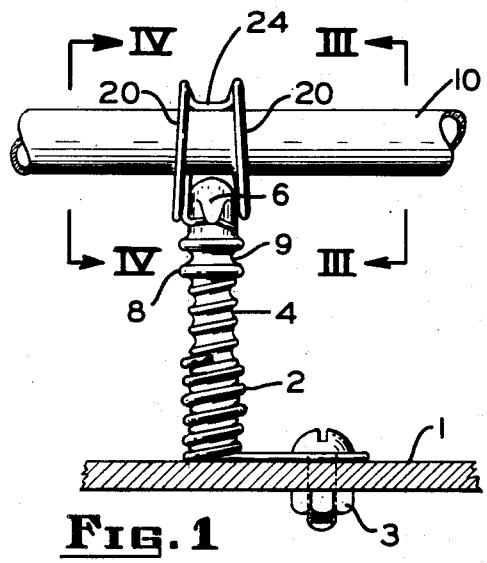
Fig. 1 is an elevational view illustrating the manner of application of the attachment of this invention.
Figure 6:
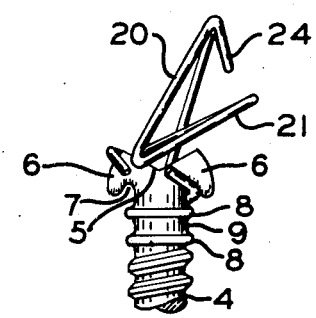
Fig. 6 is a fragmentary view in elevation illustrating the manner in which the attachment shown in Fig. 1 is applied to the end of a riser post.

Referring to Fig. 1 of the drawings, the numeral 1 designates a part of a sign panel to which a coil or wire 2 is secured by a fastener 3. The coil of wire 2 provides a fastening connection for a riser post 4 which is threaded as illustrated for threaded engagement with the convolutions of the coil 2. The outer or upper end of the riser post 4 is bifurcated to provide a saddle notch 5 of V-shape, and a pair of laterally and oppositely projecting ears or lugs 6. The under surface of each of the ears 6 is under-cut as at 7, as best shown in Fig. 6, to provide a groove in which a fastening wire may engage and be prevented from moving out of engagement with the ears 6. Inwardly of the ears 6, there is a pair of annular ridges 8 which cooperate to provide an annular recess 9. The structure thus far described is a conventional one in common and widespread use for the mounting of neon tubing 10 on a sign panel. The tubing 10 in conventional practice is tied on to the post 4 by wire which is passed under the ears 6 and through the recesses 7 and over the tube 10 in such manner that the tube 10 is tightly held in the notch 5.

In place of tying the tube on the riser post, this invention contemplates the use of a wire clip designated as a whole by the numeral 11. The wire clip comprises a base portion 12 by which it may be secured on a riser post 4, and an upper portion 13 for holding engagement with the tube 10. As will be described in greater detail below, each of the parts 12 and 13 of the clip 11 is comprised of a pair of jaws which respectively have clamping engagement with the end of the riser post 4 and with a tube 10. Generally speaking, the clip 11 is mounted in operative position by hooking the base part 12 under one of the ears 6 as illustrated in Fig. 6, and thereafter resiliently springing or distorting the base portion 12 to move it downwardly over the other of the ears 6 to a position in which it may contract and engage under the other ear 6 to mount the clip 11 in position. Thereafter, the tube 10 is attached to the clip 11 by forcing it between the jaws of the upper part 13 to a position in which such jaws are operative to lock the tube 10 against movement in such manner that sudden jars and vibrational forces are ineffective to disturb its mounting.

Figure 2:
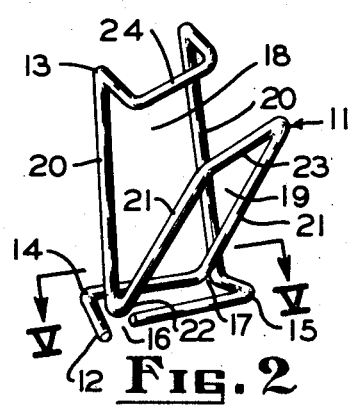
Fig. 2 is a perspective view on an enlarged scale of the attachment shown in Fig. 1.
Figure 5:
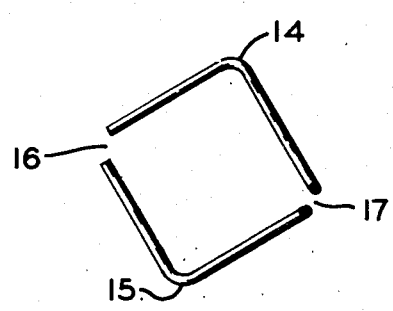
Fig. 5 is a sectional view taken along the line V—V of Fig. 2, and showing in plan the clamping jaws or wire loop by which the attachment may be secured to the end of a riser post.

As will be readily apparent from Fig. 2, the clip 11 is fabricated from a single strand of resilient wire. To form the base part 12, the terminal ends 14 and 15 of the wire are bent into the shape of a V, and are so arranged in a common plane that they cooperate to form a substantially closed wire loop which has a generally rectangular shape as will be noted from the showing of Fig. 5. The V's 14 and 15 comprise a pair of jaws for clamping engagement around the inner end of a post 4 in a manner to be described. The loop or rectangular enclosure formed by the jaws 14 and 15 is open at diametrically opposite points 16 and 17. The openings at 16 and 17 facilitate resiliently springing the jaws 14 and 15 apart from each other in a manner to be described.

The central portion of the wire forming the clip is shaped to form the upper part 13 of the clip which is comprised of a pair of jaws 18 and 19. The jaw 18 is comprised of parallel strands 20 and the jaw 19 is comprised of parallel strands 21. The strands 20 and 21 are respectively positioned in planes which are angularly inclined relative to each other, and which would intersect along a line adjacent to and passing through the points 16 and 17. Each of the strands 20 is arranged for cooperation with a similar strand 21 to provide a pair of V's spaced from each other and respectively having their vertexes adjacent the points 16 and 17. The strands 20 and 21 forming one of these V's are integrally connected at their vertex 22 adjacent the point 16, and the strands 20 and 21 forming the other of these V's are connected respectively to the inner ends of the V-shaped jaws 14 and 15 adjacent the point 17. The upper ends of the strands 21 are connected by a wire portion 23 which is in the same plane containing the strands 21. The upper ends of the strands 20 are connected by a U-shaped wire portion 24 which extends inwardly from the jaw 18 into the space between the jaws 18 and 19 for a purpose to be described.

As indicated above, the clip 11 may be mounted on a terminal post 4 with a snap action which is effected in a fraction of a second. The mounting of the clip 11 is accomplished by hooking one of the jaws 14 and 15 under one of the ears 6 with the apex of such jaw positioned in a recess 7. The other of the jaws 14 and 15 is then forced downwardly over the other ear 6 of the post 4 and in so doing, the loop formed by the post 14—15 is expanded. At this point, it will be noted that the separation of the jaws 14—15 at the points 16 and 17 enables the resilient expansion of the wire loop. When the other jaw 14—15 is moved downwardly to a point where it will clear the lower edge of the other ear 6, the jaws 14—15 will resiliently contract so that the apex of the other jaw 14—15 will move inwardly to a position in the recess 7 under the other ear 6. The resilience of the jaws 14 and 15 due to their connection to the strands 20 and 21 will maintain the jaws 14—15 in clamping engagement with the post 4 in the space between the ears 6 and the upper ridge 8. If desired, the jaws 14 and 15 may have a resilient clamping engagement in a recess such as the recess 9.

Figure 4:
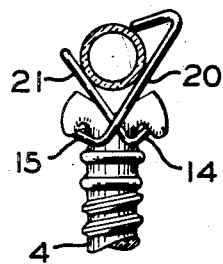
Fig. 4 is a view taken substantially along the line IV—IV of Fig. 1.
Figure 3:
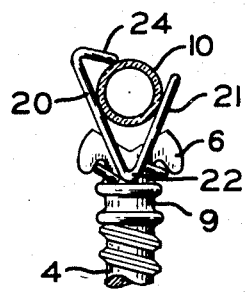
Fig. 3 is a view taken substantially along the line III—III of Fig. 1.

To secure a tube 10 in position on the post 4, the tube is placed in engagement with the parts 23 and 24 and pressed inwardly to move it to a position between the jaws 18 and 19. This inward movement of the tube 10 resiliently forces the jaws 18 and 19 apart from each other, and in so doing, the tube 10 moves to a position between the jaws 18 and 19. At this point, it will be noted that resiliently forcing the jaws 18 and 19 apart tends to move the lower jaws 14 and 15 toward each other, and thereby into tighter clamping engagement with the end of a riser post 4. When the tube 10 moves to a position between the jaws 18 and 19, such jaws will resiliently contract to engage the strands 20 and 21 with the sides of the tube 10. The angular inclination of the strands 20 and 21 is such that their resilient engagement with the sides of the tube 10 will cam the tube 10 upwardly into engagement with the under surface of U-shaped connector 24 as illustrated in Figs. 3 and 4. The U-shaped connector 24 thus provides a third point of engagement of the clip 11 with the tube 10, and additionally functions to limit outward movement of the tube with respect to the jaws 18 and 19.

From the foregoing, it will be noted that the clip 11 is comprised of two separate pairs of resiliently connected jaws. The lower jaws 14 and 15 may be readily engaged with a snap action over the end of a conventional post to mount the clip in position. Thereafter, the tube 10 may be mounted in position with a snap action by merely forcing it to an operative holding position between the jaws 18 and 19. Attention is particularly directed to the fact that movement of the tube 10 to an operative mounted position between the jaws 18 and 19 is effective to increase the clamping force exerted by the clip mounted jaws 14 and 15. Attention is also directed to the fact that the jaws 18 and 19 are effective to provide a support for the tube 10 while maintaining it out of engagement with the end of the post 4. In addition, attention is directed to the fact that the clip may be fabricated entirely from a single strand of resilient steel wire and that no special tools, or tools of any kind, are required to mount it in position or to secure a tube thereto after it has been mounted in position. It will thus be apparent that the clip 11 while being relatively simple in construction is highly effective in the mounting of luminous tubing on a conventional riser post 4.

While I have illustrated and described one specific embodiment of my invention, it will be understood that this is merely by way of illustration, and that various changes and modifications may be made therein within the contemplation of my invention and under the scope of the following claims.

I claim:

1. A mounting attachment comprising a wire having its ends shaped to provide a pair of jaws with its central portion resiliently connecting said jaws, said central portion being shaped to provide a second pair of jaws, each of said second pair of jaws comprising a pair of parallel spaced wire strands connected at their outer ends by a transversely extending wire portion, each strand of one of said second pair of jaws forming a V with a similar strand in the other of said second pair of jaws whereby said second pair of jaws is comprised of a pair of said V's spaced from each other, the lower ends of the strands forming one of said V's being integrally connected to each other and the lower ends of the strands forming the other of said V's being integrally connected respectively to one of said first-named pair of jaws.

2. An attachment as claimed in claim 1 wherein one of said transversely extending wire portions has a U-shape and projects into the space between said jaws.

RICHARD V. STAAF.

References Cited in the file of this patent

UNITED STATES PATENTS

| Number | Name | Date |
|---|---|---|
| 1,207,486 | Bradley | Dec. 5, 1916 |
| 1,267,694 | Ralston | May 28, 1918 |
| 2,067,818 | Bell | Jan. 12, 1937 |